(12) United States Patent
Zhinong et al.

(10) Patent No.: US 12,265,599 B2
(45) Date of Patent: Apr. 1, 2025

(54) SYSTEM AND METHOD FOR BIOMETRIC-BASED AUTHENTICATION VIA CNN WITH LINEAR ACTIVATION AND MAX POOLING

(71) Applicant: ARMATURA LLC, Alpharetta, GA (US)

(72) Inventors: Li Zhinong, Alpharetta, GA (US); Xiaowu Zhang, Alpharetta, GA (US)

(73) Assignee: ARMATURA LLC, Alpharetta, GA (US)

( * ) Notice: Subject to any disclaimer, the term of this patent is extended or adjusted under 35 U.S.C. 154(b) by 246 days.

(21) Appl. No.: 17/902,141

(22) Filed: Sep. 2, 2022

(65) Prior Publication Data

US 2024/0078299 A1  Mar. 7, 2024

(51) Int. Cl.
*G06F 21/32* (2013.01)
*G06V 40/12* (2022.01)

(52) U.S. Cl.
CPC .......... *G06F 21/32* (2013.01); *G06V 40/1365* (2022.01)

(58) Field of Classification Search
CPC ............................. G06F 21/32; G06V 40/1365
See application file for complete search history.

(56) References Cited

U.S. PATENT DOCUMENTS

| | | | | |
|---|---|---|---|---|
| 2019/0311098 A1* | 10/2019 | Baldwin | ................ | G06N 3/045 |
| 2020/0294508 A1* | 9/2020 | Kwasiborski | ........ | H04R 25/505 |
| 2020/0302041 A1* | 9/2020 | Mohammad | ......... | G06V 40/172 |
| 2021/0110018 A1* | 4/2021 | Rowe | ..................... | G06V 10/82 |
| 2022/0182239 A1* | 6/2022 | Hassanzadeh | ........ | H04L 9/0866 |
| 2022/0277579 A1* | 9/2022 | Svoboda | ................. | G06F 21/32 |
| 2022/0392452 A1* | 12/2022 | Gupta | ..................... | G06F 21/32 |
| 2023/0128577 A1* | 4/2023 | Schei | .................. | G06V 40/173 726/18 |

FOREIGN PATENT DOCUMENTS

| | | | |
|---|---|---|---|
| CN | 105138993 A | 12/2015 |
| CN | 106599797 A | 4/2017 |
| CN | 106650674 A | 5/2017 |
| CN | 107622225 A | 1/2018 |
| CN | 109977887 A | 7/2019 |
| CN | 110008793 A | 7/2019 |
| CN | 111191587 A | 5/2020 |
| CN | 111368790 A | 7/2020 |
| CN | 111582224 A | 8/2020 |

* cited by examiner

*Primary Examiner* — Frantz B Jean

(74) *Attorney, Agent, or Firm* — Venable LLP

(57) ABSTRACT

The present teaching relates to method, system, medium, and implementations for biometric-based authentication. When an input image representing biometric information of a person to be authenticated is received, a feature vector of the input image is generated based on the biometric information captured in the input image via a convolution neural network (CNN) that is realized using one or more linear activation functions. The person is authenticated based on the feature vector in accordance with a biometric-based recognition model.

21 Claims, 15 Drawing Sheets

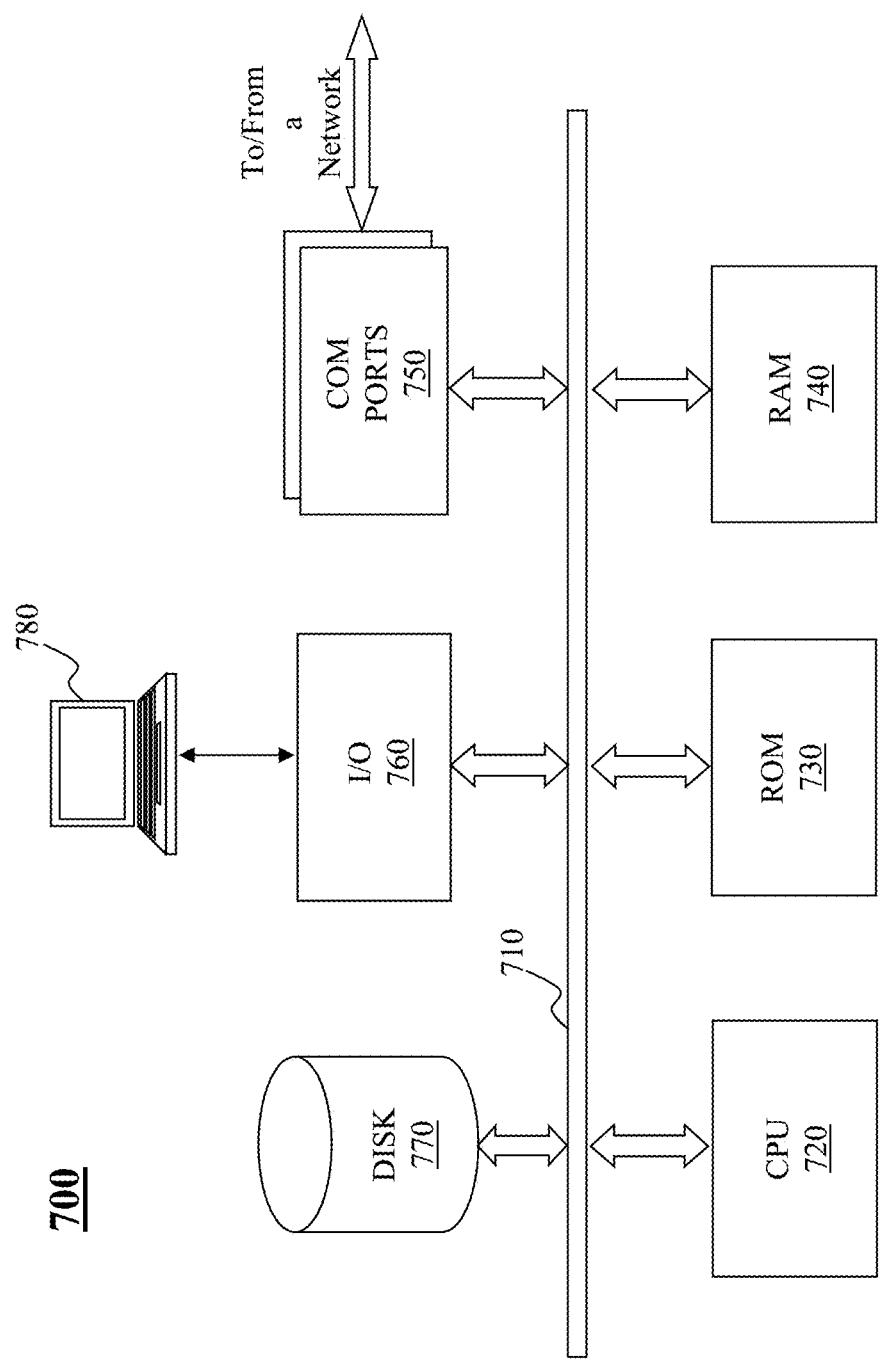

SYSTEM AND METHOD FOR BIOMETRIC-BASED AUTHENTICATION VIA CNN WITH LINEAR ACTIVATION AND MAX POOLING

BACKGROUND

1. Technical Field

The present teaching generally relates to computers. More specifically, the present teaching relates to computerized authentication.

2. Technical Background

With the development of the Internet and the ubiquitous network connections, more and more secure access controls are done by authenticating a person via his/her biometrics. For example, most smart phones nowadays deploy either fingerprint or face based biometric-based authentication. Some public places such as airports and government buildings, access to such secure areas may also be controlled via biometric-based authentication. Private companies have also used biometrics to not only control access to workplaces but also keep track of attendances of employees. Different types of biometrics have been used for authentication, including fingerprint, finger veins, faces, palms, and palm veins. FIG. 1A shows an example of using palm for recognizing a person in authentication. In this example, a person who is to be authenticated may place a palm 100 over a palm-based authentication device 110, as shown in FIG. 1A. A typical implementation of the palm-based recognition device 100 is provided in FIG. 1A, where the palm-based recognition device 100 may generally include a palm imaging unit 120, a feature extraction unit 140, and a palm-based recognition unit 160.

The palm imaging unit 120 is typically provided for acquiring a palm image 130 of a palm placed over the device 110. The acquired palm image is then processed by the feature extraction unit 140 to extract relevant features 150 to be used to identify a persons' identity. Such extracted palm features may then be used by the palm-based recognition unit 160 to recognize the identity of the person. When other types of biometric information are used for authentication, the same process is applied. To reliably recognize each individual, it is essential to accurately detect the unique biometric features associated with the individual. In recent years, convolutional techniques have been applied in biometric-based recognition in different settings, whether it is recognition based on fingerprint, palm, face, etc. Specifically, convolutional neural networks (CNNs) have been used for biometric-based recognition tasks.

FIG. 1B illustrates a typical CNN 170 architecture for, e.g., palm-based recognition. In this typical architecture, the CNN include multiple layers, including an input layer 170-1, a convolution layer 170-2, a full connection layer 170-3, and a classification layer or SoftMax layer 170-4. The convolution layer 170-2 usually include multiple convolutional layers, as shown in FIG. 1C, where each layer includes a convolution operation and optionally a pooling operation or a dropout operation. In each layer, non-linear activation function is used for the purpose of enhancing the quality of fit and capture the non-liner characteristics of the features exhibited in an input biometric image.

While the quality of fit may be improved, it often leads to overfitting which may cause that the characteristics presented to the full connection layer 170-3 may not align with the positions of the features in the images so that when comparing such extracted features with previously stored features, it affects the precision of the match and hence, the performance of the recognition. Some attempts have been made to use stacked convolution plus pooling to derive image features as a vector to improve the alignment, a commonly used approach to do so is to use non-linear activation function to improve the expressiveness of the representation. However, this further leads to the same overfitting problem.

Thus, there is a need for a solution that addresses the issues identified herein.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for biometric-based authentication. When an input image representing biometric information of a person to be authenticated is received, a feature vector of the input image is generated based on the biometric information captured in the input image via a convolution neural network (CNN) that is realized using one or more linear activation functions. The person is authenticated based on the feature vector in accordance with a biometric-based recognition model.

In a different example, a system is disclosed for biometric-based authentication. The system includes an imaging unit, a biometric feature extraction unit, and an authentication unit. The imaging unit is configured for acquiring an input image representing biometric information of a person to be authenticated. The biometric feature extraction unit is configured for generating a feature vector of the input image based on the biometric information captured in the input image via a convolution neural network (CNN) that is realized using one or more linear activation functions. The authentication unit is configured for authenticating the person based on the feature vector in accordance with a biometric-based recognition model.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for biometric-based authentication. The information, when read by the machine, causes the machine to perform the following steps. When an input image representing biometric information of a person to be authenticated is received, a feature vector of the input image is generated based on the biometric information captured in the input image via a convolution neural network (CNN) that is realized using one or more linear activation functions. The person is authenticated based on the feature vector in accordance with a biometric-based recognition model.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is an illustrative diagram of an exemplary computing device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 1A:
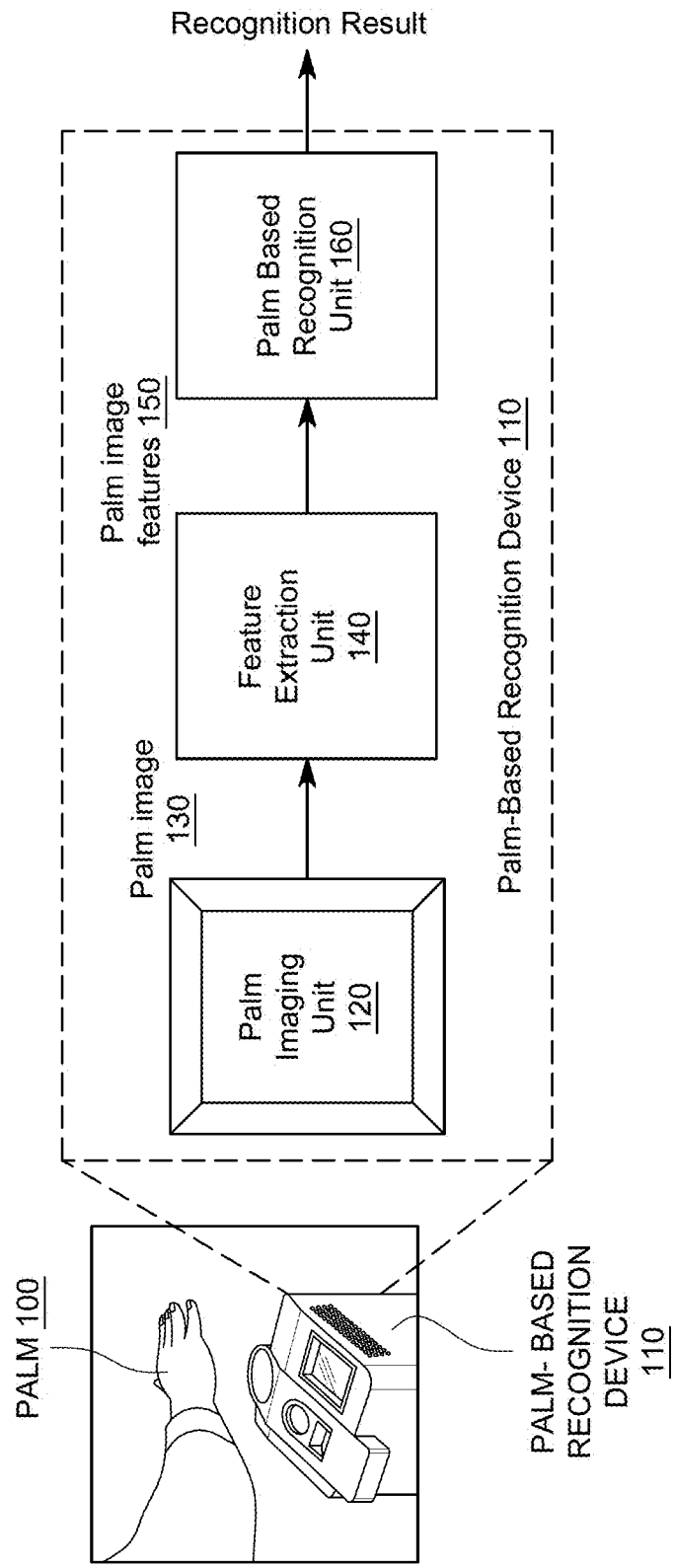
FIG. 1A illustrates the traditional framework for recognizing individual's identity based on biometric information.
Figure 1B:
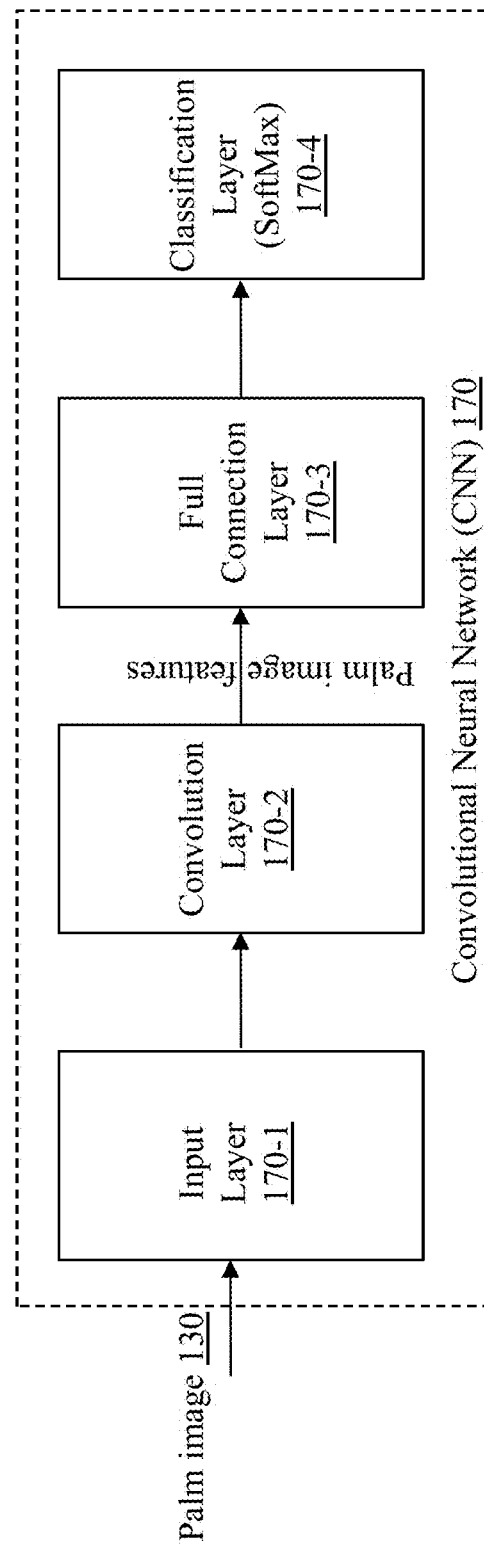
FIG. 1B is a traditional convolutional neural network (CNN) architecture for biometric-based recognition.
Figure 1C:
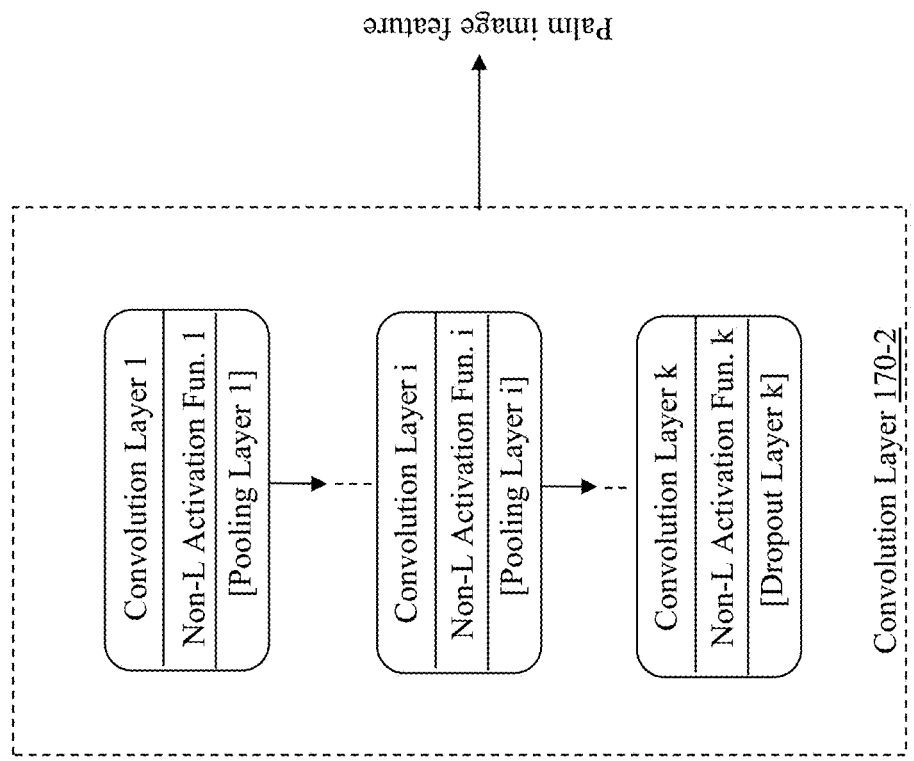
FIG. 1C (PRIOR ART) provides a traditional construct of a convolution layer of a CNN.
Figure 2A:
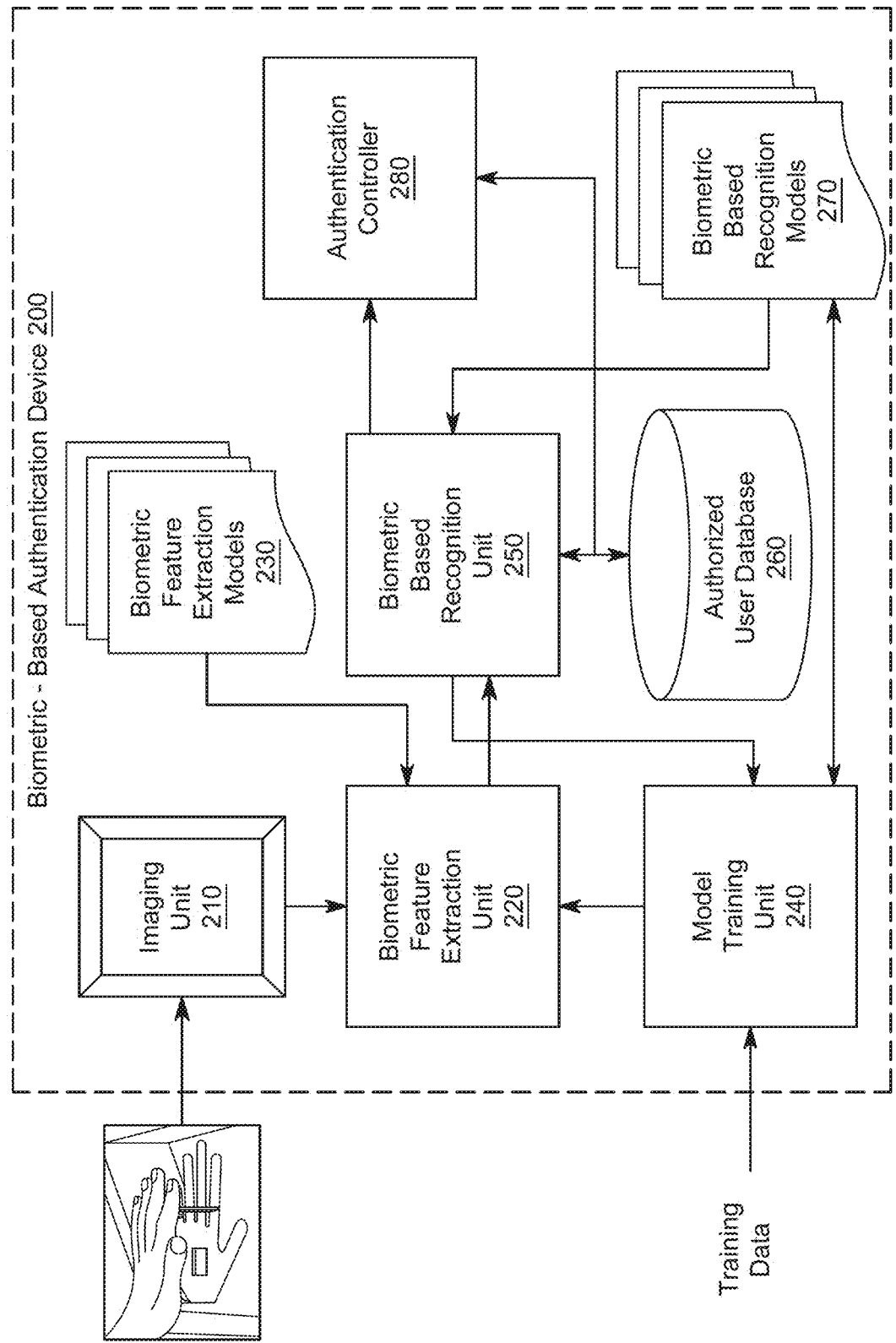
FIG. 2A depicts an exemplary high level system diagram of a biometric-based authentication device, in accordance with an embodiment of the present teaching.

The present teaching discloses a solution for enhanced biometric feature extraction from a biometric image using linear activation functions at certain convolution layers of a convolutional neural network to achieve improved biometric-based recognition and corresponding applications of the present teaching in biometric authentication. FIG. 2A depicts an exemplary high level system diagram of a biometric-based authentication device 200, in accordance with an embodiment of the present teaching. In the following discussions, the biometric-based authentication device 200 is described using palm image-based authentication for discussion purposes, which is merely for illustration rather than for limitation to the present teaching. The biometric-based authentication device 200 as depicted in FIG. 2A may generally be applied to authentication based on any type of biometric information.

The exemplary biometric-based authentication device 200 comprises an imaging unit 210, a biometric feature extraction unit 220, a model training unit 240, a biometric based recognition unit 250, and an authentication controller 280. The model training unit 240 is provided herein for training, via machine learning, biometric-based recognition models 270 based on training data provided thereto. In some embodiments, the model training unit 240 may also be used to train the biometric feature extraction models 230, which may be done either simultaneously with the training of the biometric based recognition models 270 or independently in a separate learning process. Once the biometric-based recognition models 270 are trained, they may be used for recognizing the identity of a person whose biometric image is captured by the imaging unit 210. In operation, a person who is to be authenticated may present his/her biometric information such as a palm and the imaging unit 210 acquires an image of the biometric information presented. Such acquired biometric image is sent to the biometric feature extraction unit 220 where biometric features present in the biometric image are extracted, e.g., based on biometric feature extraction models 230. In some embodiments, such biometric feature extraction models 230 may also be trained via machine learning (not shown in FIG. 2A).

Based on the biometric features extracted from the acquire biometric image, the biometric based recognition unit 250 performs recognition based on the biometric based recognition models 270 and compared with biometric-based identities of authorized individuals stored in an authorized user database 260. If a match is found between the extracted biometric features from the acquired image and previously stored biometric representations of authorized individuals, the person is authenticated and the authentication controller 280 issues its authentication decision accordingly. If no match is found, the authentication controller 280 rejects the person as unauthorized.

Figure 2B:
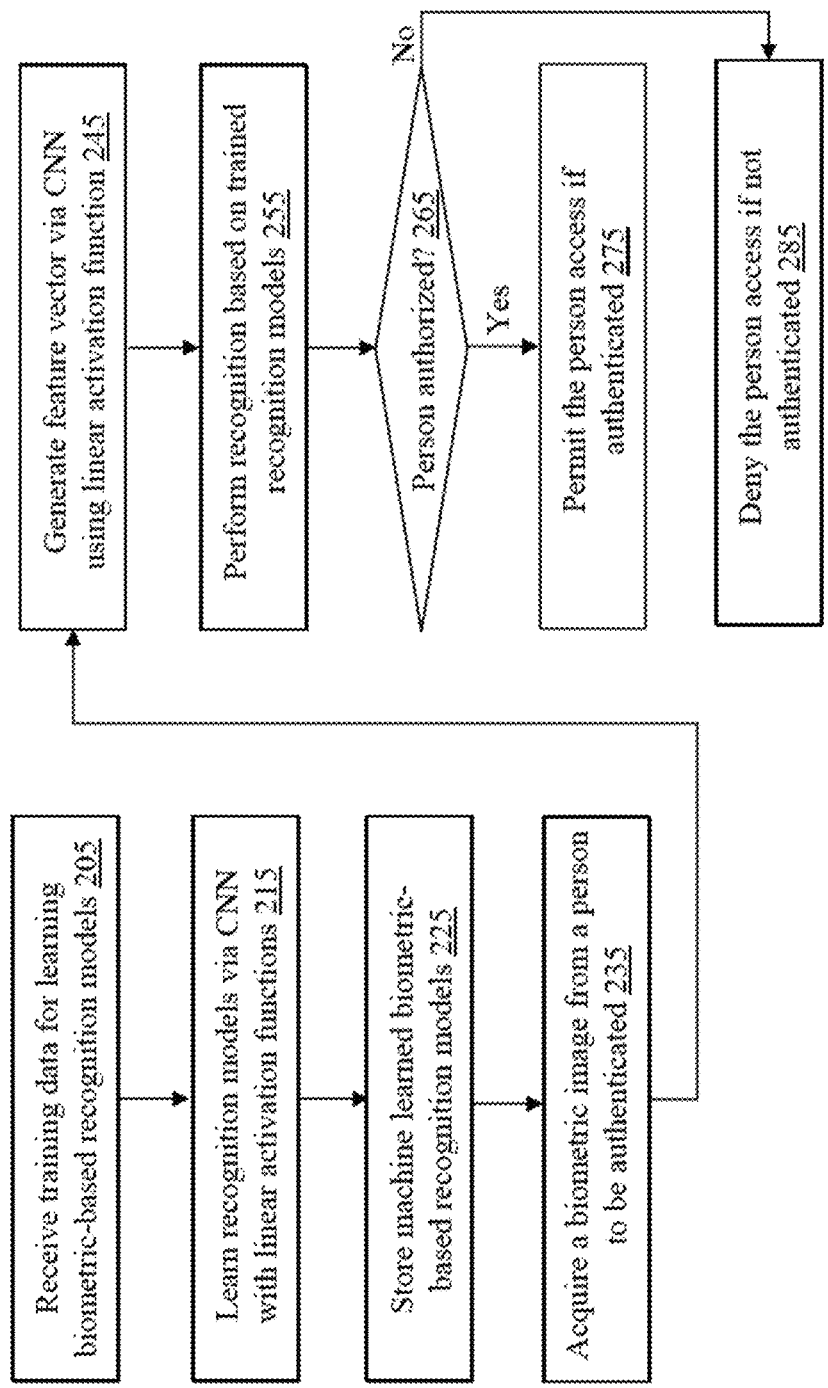
FIG. 2B is a flowchart of an exemplary process of a biometric-based authentication device, in accordance with an embodiment of the present teaching.

FIG. 2B is a flowchart of an exemplary process of the biometric-based authentication device 200, in accordance with an embodiment of the present teaching. First the model training unit 240 receives, at 205, training data, based on which the model training unit 240 learns, at 215, the biometric-based recognition models 270. The learned models are then stored, at 225, for future recognition. It is noted that although the biometric-based authentication device 200 may be applied to different types of biometric information, each specific implementation of the biometric-based authentication device 200 may be directed to specific type(s) of biometric information to be used for authentication. For instance, if the biometric-based authentication device 200 may be provided for authentication based on palm information or palm plus fingerprint information. In the former case, the training data for learning the recognition models 270 may be associated with palm images and recognition ground truth based on palm information. In the latter case, the training data used for training the recognition models 270 may be associated with both palm and fingerprint images and the recognition ground truth based on both types of biometric information.

With the trained recognition models 270, when the imaging unit 210 acquires, at 235, a biometric image (e.g., a palm image) from a person to be authenticated, the biometric feature extraction unit 220 may be invoked to generate, at 245, a feature vector representing the acquired biometric image. According to the present teaching, the biometric feature extraction unit 220 may be realized with a CNN with some portion using linear activation functions therein (instead of non-linear activation functions as in the traditional systems). Based on the biometric feature vector extracted from the acquired biometric image, the biometric-based recognition unit 250 performs recognition, at 255, in accordance with the biometric-based recognition models 270. If the person is authenticated, determined at 265, e.g., the person is one of the authorized users stored in the authorized user database 260, the authentication controller 280 may then permit, at 275, the person's access request. If the person is not authenticated, e.g., the person is not any of the users authorized as recorded in the authorized user database 260, the authentication controller 280 denies, at 285, the person's requested access.

Figure 3A:
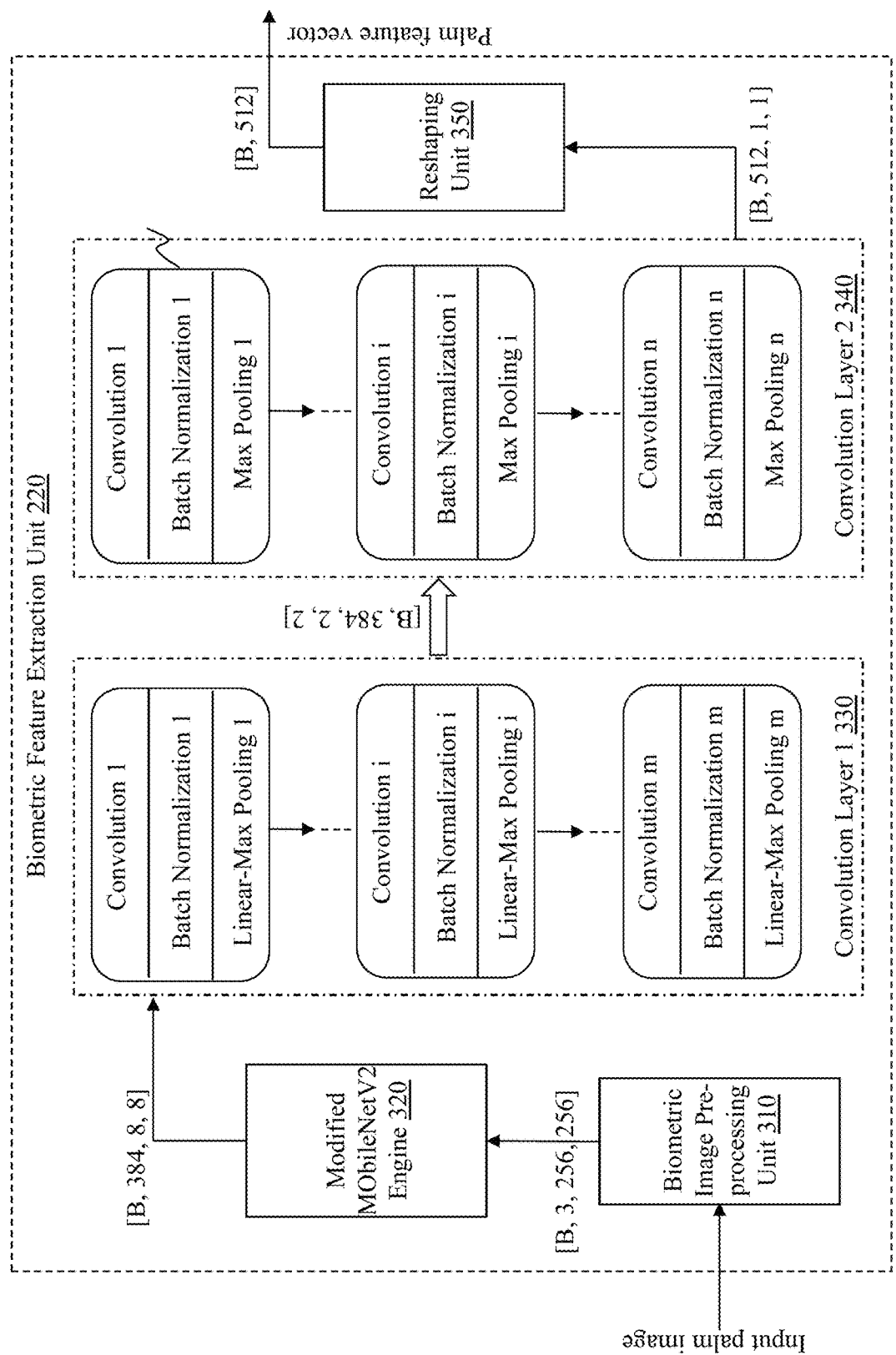
FIG. 3A depicts an exemplary construct of a biometric feature extraction unit, in accordance with an embodiment of the present teaching.
Figure 4A:
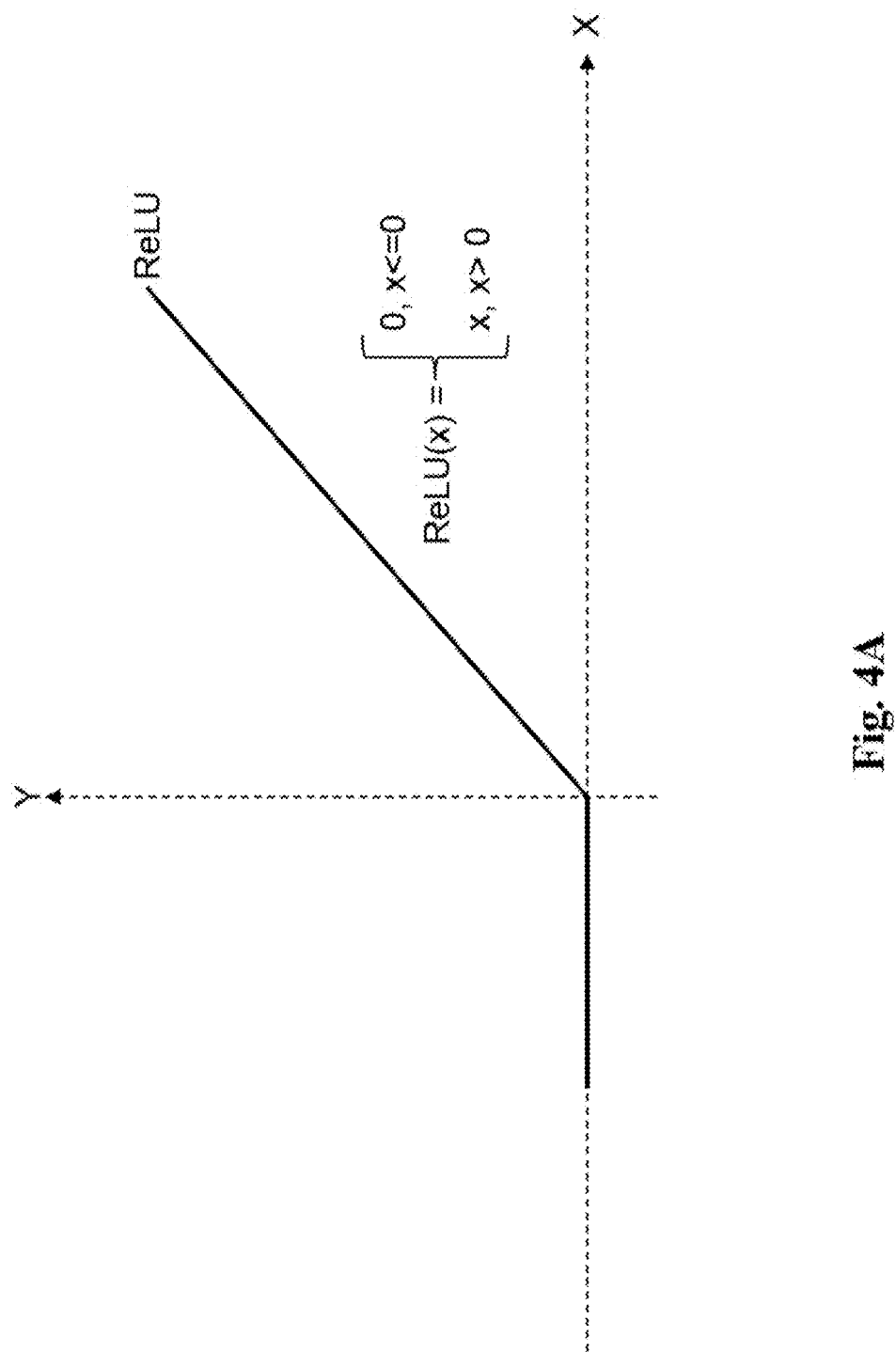
FIGS. 4A-4C illustrate exemplary types of linear activation functions that can be deployed in the convolution layer, in accordance with an embodiment of the present teaching.
Figure 4B:
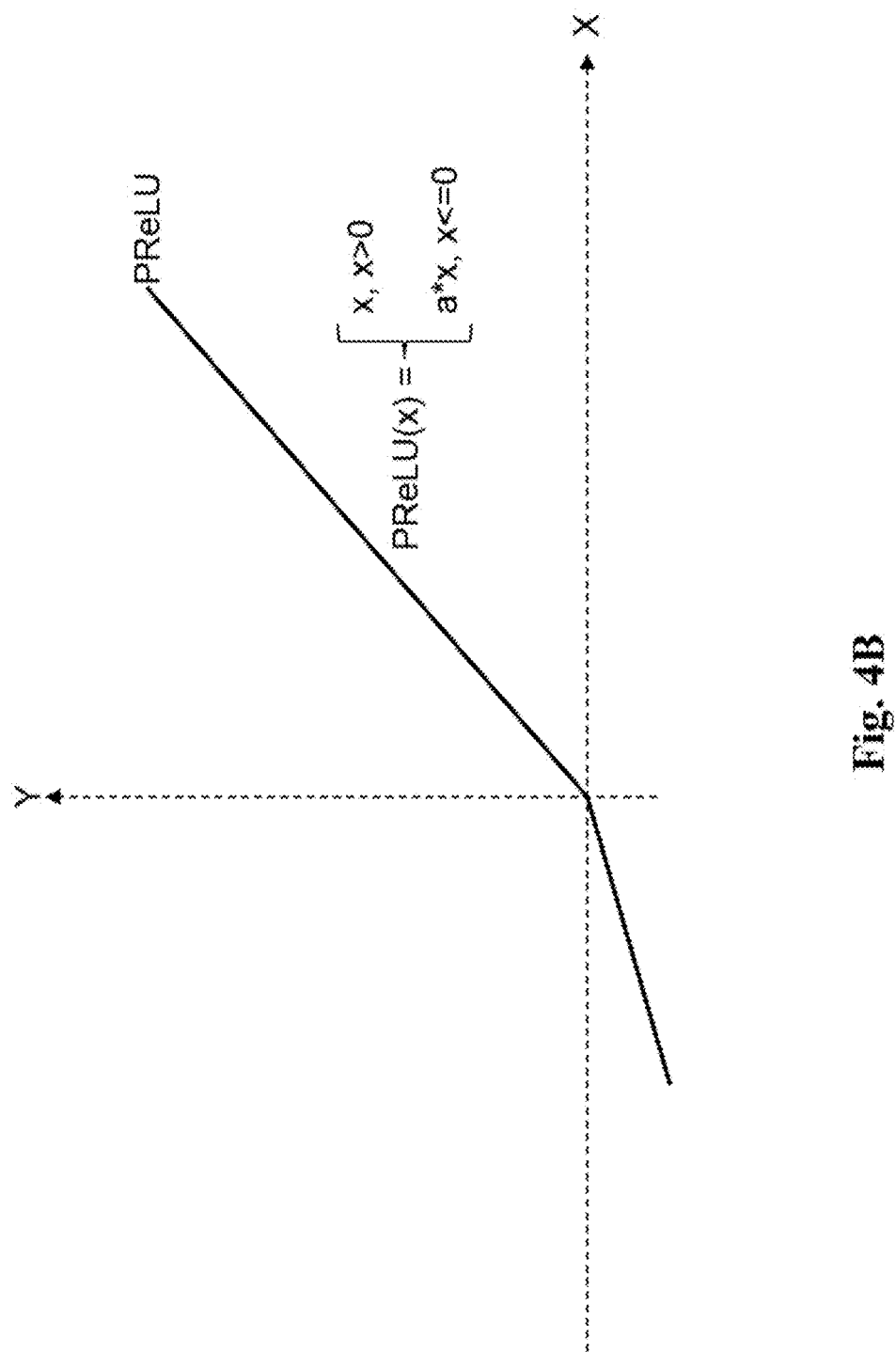
Figure 4C:
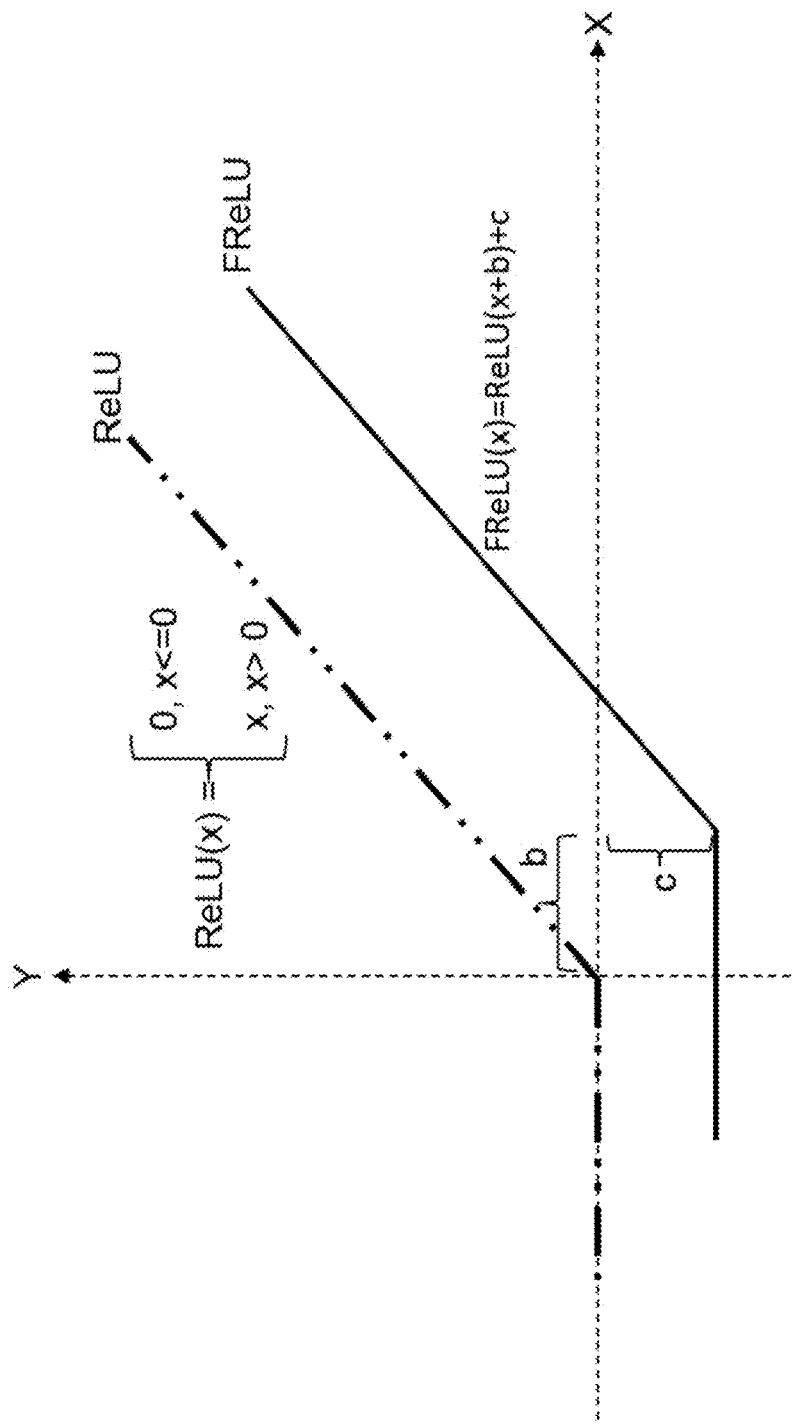

FIG. 3A depicts an exemplary construct of the biometric feature extraction unit 220, in accordance with an embodiment of the present teaching. As discussed herein, the biometric feature extraction unit 220 may be realized with a modified CNN architecture with some of the convolution operations employing therein using linear activation functions. FIGS. 4A-4C provide different linear activation functions. For instance, FIG. 4A describes the rectified linear unit activation function, which is defined as ReLU(x)=0 for x<=0, and ReLU(x)=x for x>0. FIG. 4B describes another form of rectified linear unit activation function, called parametric rectified linear unit activation function or PReLU, which, as shown, is defined as PReLU(x)=a*x for x<=0 and PReLU(x)=x for x>0, i.e., when x<=0, the linear function has a different slope (a) than that (1) when x>0.

Yet another form of rectified linear unit activation function is called flexible rectified linear unit activation function or FReLU, which is defined as FReLU(x)=ReLU(x+b)+c, where a and b are translation (shifts) along x and y axes and are parameters that can be learned during training. A traditional CNN deployed for biometric-image processing may use non-linear activation functions which causes overfitting and negatively impacts recognition performance. By replacing such activation functions with suitable linear activation functions such as the ones illustrated in FIGS. 4A-4C may alleviates this issue so that characteristics of the biometric features may better align with the positions of the features in the images, which can enhance the recognition performance.

Figure 4D:
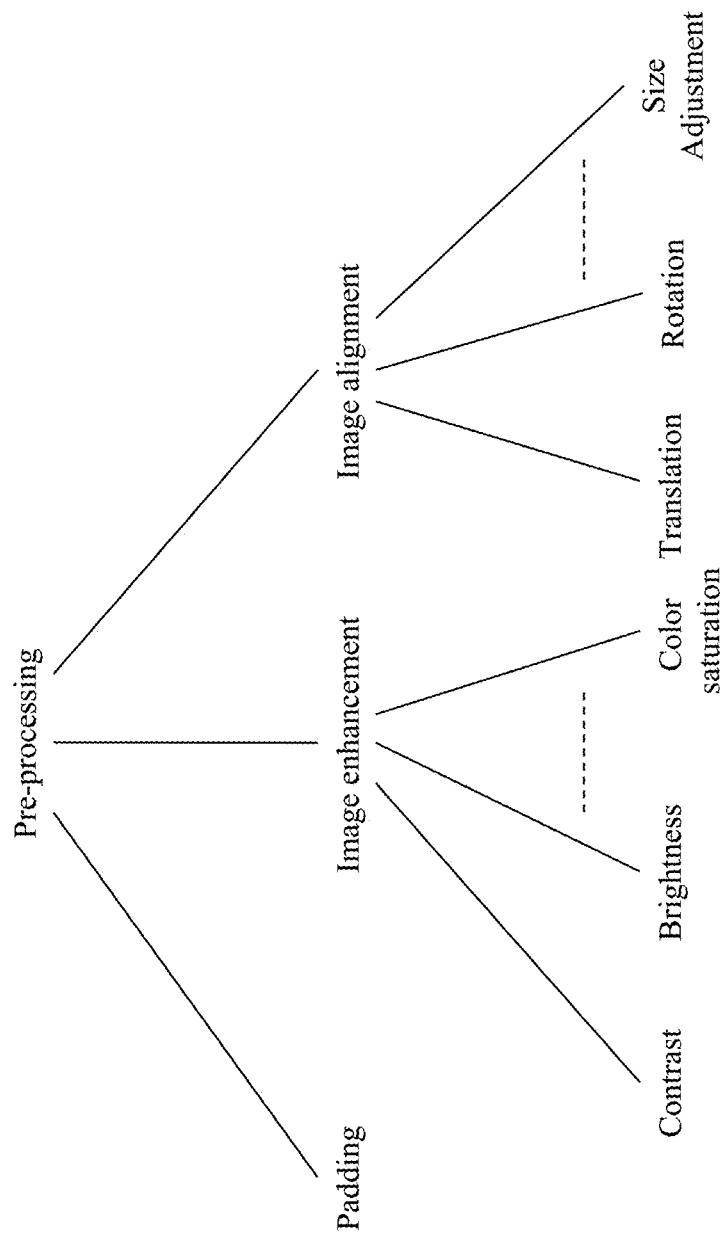
FIG. 4D show exemplary types of preprocessing in extracting biometric features from a biometric image.

In the illustrated embodiment shown in FIG. 3A, the biometric feature extraction unit 220 comprises a biometric image pre-processing unit 310, a modified MobileNetV2 engine 320, a convolution layer 1 330, a convolution layer 2 340, and a reshaping unit 350. The biometric image pre-processing unit 310 is provided to process a biometric image acquired from a sensor to, e.g., convert into a form appropriate for convolutions and/or enhance the image. FIG. 4D illustrates exemplary types of pre-processing that may be applied to a biometric image, e.g., a palm image. For example, a biometric image may be padded along some dimension to meet certain requirement for further processing. For instance, the CNN processing may require a squared image so that an acquire image of a rectangular shape may be padded in one dimension to satisfy the required squared image size. Preprocessing may also include any processing related to image enhancement such as contrast enhancement, intensity brightness enhancement, . . . , or enhancement directed to color saturation. Preprocessing may also include certain operations that are applied to align an image in a certain way according to some criteria, e.g., image may be translated, rotated, . . . , and image size may be adjusted according to some application dependent needs. For instance, to achieve better recognition, a palm image may be rotated in such a way that the palm as seen in the image is in a straight position to minimize the negative impact to recognition due to rotated palm. In some situation, an image may be translated in a way so that the region of interest (ROI) related to, e.g., a palm, is centered in the image. In some situation, an image may need to be resized if, e.g., the ROI of a palm is too big.

The pre-processed biometric image may then be output from the preprocessing unit 310 to the modified MobileNetV2 engine 320 for further processing. In some embodiments, the conventional MobileNetV2 framework may be modified according to the present teaching in such a way that the activation functions traditionally deployed therein are replaced with FReLU activation functions to form the modified MobileNetV2 engine 320. The output from the modified MobileNetV2 engine 320 may then further processed by the convolution layer 1 330, that includes multiple convolution stages, each of which comprises a convolution operation, a batch normalization operation, and a linear max pooling operation using some chosen linear activation function, which can be any of ReLU, PReLU, or FReLU action functions. In some embodiments, the output from convolution layer 1 may further be processed by the convolution layer 2 340 with multiple stages, each of which includes convolution operation, batch normalization operation, and max pooling operation. The output of the convolution layer 2 340 is a matrix [B, C, 1, 1], where B is the batch size, C represents the number of channels. This matrix is then reshaped by the reshaping unit 350 to produce B C dimensional vectors, each of which corresponds to a feature vector for a biometric image in the batch of B images.

Figure 3B:
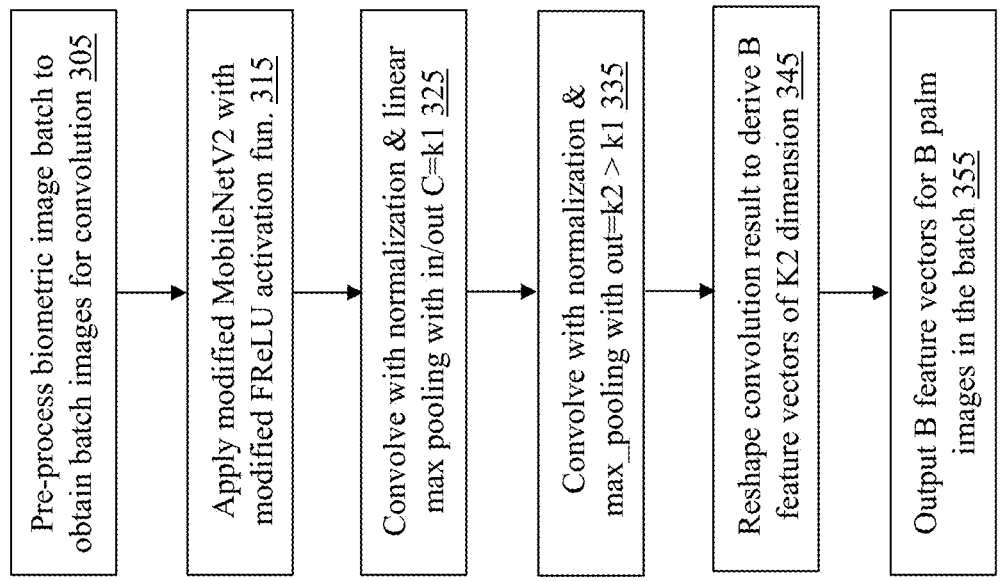
FIG. 3B is a flowchart of an exemplary process of a biometric feature extraction unit, in accordance with an embodiment of the present teaching.

FIG. 3B is a flowchart of an exemplary process of the biometric feature extraction unit 220, in accordance with an embodiment of the present teaching. Although a specific case with data of a certain dimension is used as an example to describe the feature extraction process, it is understood that it is merely for illustration and not intended as a limitation to the present teaching. Data with any dimensions may be processed in a similar manner as described herein. In this example, an input image to the biometric feature extraction unit 220 may be of size [3, 224, 192], where the input image has a dimension of [224, 192] (rectangular) with each pixel having 3 color components (R, G, B). If the input is a batch B of images, the input corresponds to data with a dimension of [B, 3, 224, 192]. When the biometric image preprocessing unit 310 receives such an input batch, it preprocesses, at 305, the input image batch to obtain input image batch for convolution. For instance, if subsequent convolutions require a squared image, the biometric image pre-processing unit 310 may convert each rectangular image of [3, 224, 192] to produce a squared image of [3, 256, 256] (e.g., via padding) to produce an output matrix of [B, 3, 256, 256]. Other preprocessing may also be applied such as contrast enhancement, rotation, and translation to make the ROIs centered better, etc. Such preprocessed batch data [B, 3, 256, 256] is then fed to the modified MobileNetV2 engine 320 for further processing.

With this specific example, the modified MobileNetV2 engine 320 applies, at 315, operations at different layers to image matrix [B, 3, 256, 256] with FReLU activation functions deployed therein. Five successive convolutions are applied with stride=2 to down sample the matrix, which yields a matrix of [B, 384, 8, 8] as output data, which is sent to the convolution layer 1 330 for further processing. At convolution layer 1, multiple stages of processing are applied, at 325, to [B, 384, 8, 8] and, as shown in FIG. 3A, each stage involves convolution, batch normalization, and linear-max pooling operations. When 3×3 convolution kernel, 2×2 pooling kernel, and stride=2 are used, two successive stages of convolution, batch normalization, and linear-max pooling operations yield a matrix of size [B, 384, 2, 2], where the number of channels C=k1=384 remains the same. The matrix of size [B, 384, 2, 2] is then processed further by the convolution layer 2 340 at 335 to produce an output of [B, 512, 1, 1] where C=k2=512. In some embodiments, in convolution, to achieve C=512, a 3×3 convolution kernel is used with padding=1 with batch normalization and max pooling using a pooling kernel of 2×2 with stride=2. Such a processing result [B, 512, 1,1] may then be reshaped by the reshaping unit 350, at 345, to generate [B, 512], i.e., B feature vectors, each of which is 512 dimensional and represents one of the B images in the input batch. Such feature vectors extracted from input images can then be sent to the biometric-based recognition unit 250 (see FIG. 2A) where biometric-based recognition is performed based on such feature vectors. As discussed herein, the recognition is performed in accordance with biometric-based recognition models 270 obtained via machine training by the model training unit 240.

Figure 5A:
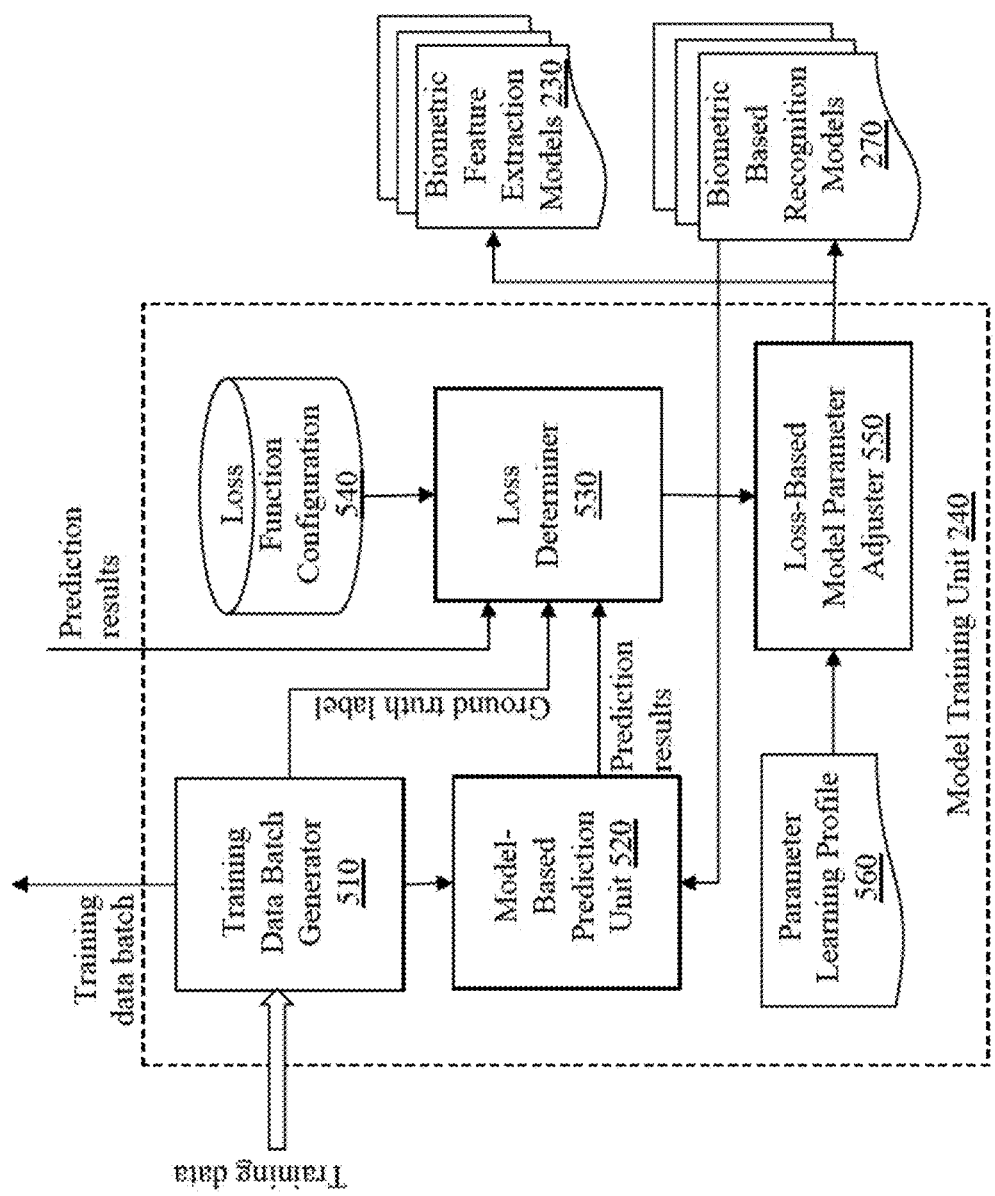
FIG. 5A depicts an exemplary high level system diagram of a recognition model training unit, in accordance with an embodiment of the present teaching.

FIG. 5A depicts an exemplary high level system diagram of the model training unit 240, in accordance with an embodiment of the present teaching. In this illustrated embodiment, the model training unit 240 comprises a training data batch generator 510, a model-based prediction unit 520, a loss determiner 530, and a loss-based model parameter adjuster 550. In some embodiments, the training data may include biometric images and ground truth labels as to the identity of the person whose biometric information is captured in the biometric image. In some embodiments, the training data may also include ground truth feature vectors for the biometric images and in that case, the learnable parameters associated with CNN deployed for biometric feature extraction may also be learned based on the ground truth feature vectors. As discussed herein, the learning of the learnable parameters specified in the biometric feature extraction models 230 may be done either simultaneously in learning the biometric-based recognition models 270 or may be done in a separate machine learning process.

Figure 5B:
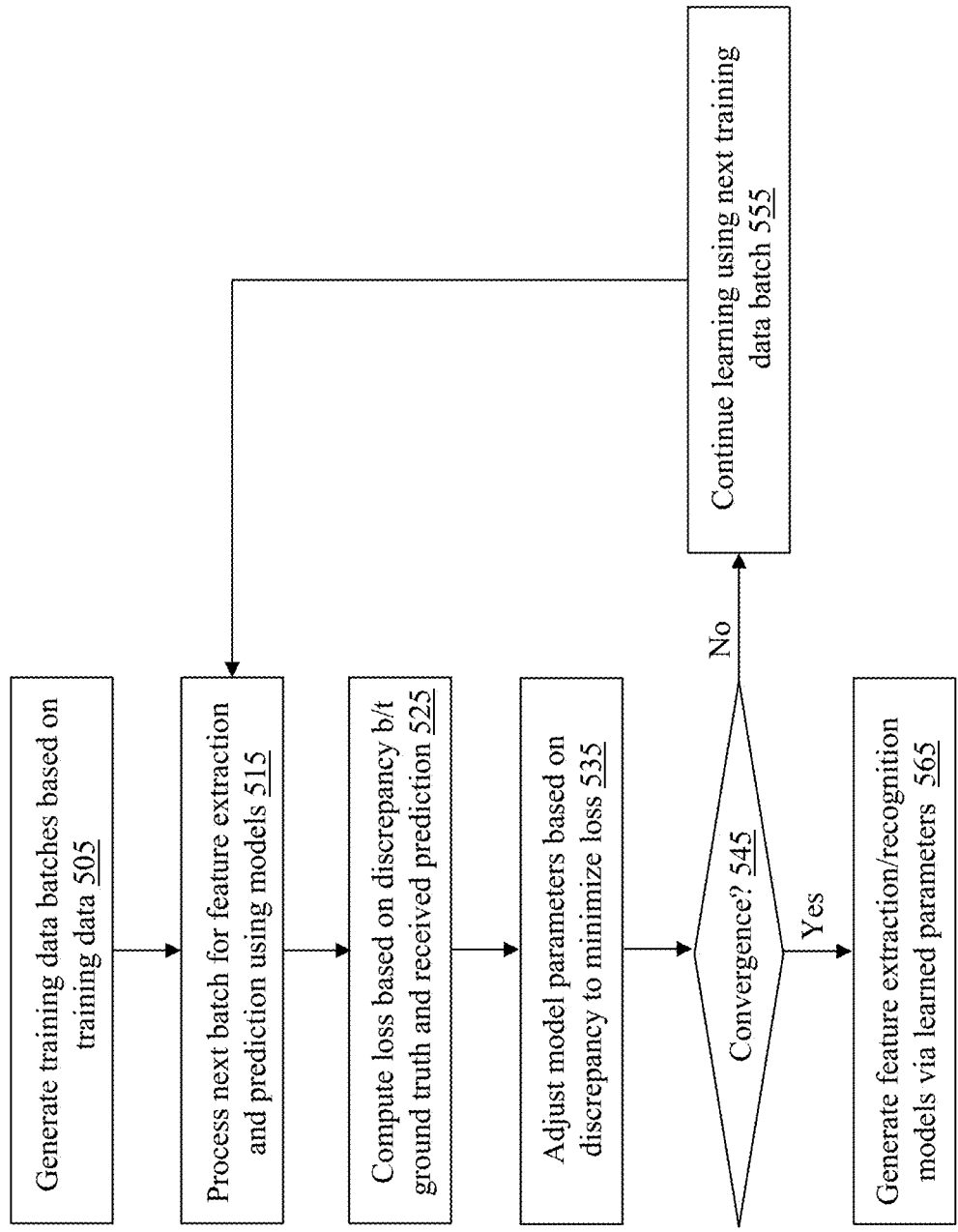
FIG. 5B is a flowchart of an exemplary process of a recognition model training unit, in accordance with an embodiment of the present teaching.

The training of models (both 230 and 270) may be via machine learning conducted in a feedback framework where model parameters are iteratively adjusted to minimize a loss determined based on ground truth and the predictions, which include a feature vector (in case of learning the learnable parameters used in feature extraction) and/or a predicted identity label. FIG. 5B is a flowchart of an exemplary process of the model training unit 240, in accordance with an embodiment of the present teaching. In operation, when the training data batch generator 510 receives training data, it generates, at 505, training data batches. For example, each batch may include B training samples, each of which may include at least some of a biometric image, a feature vector, and a ground truth label as to the identity of an individual. In some embodiments, when the training is for deriving the biometric-based recognition models 270, the training data needed in this case may include only biometric images and their corresponding ground truth labels. In some embodiments, when the training is for deriving the biometric feature extraction models 230 to learn various learnable parameters (such as kernel values, parameters a, b, and c used in linear activation functions, etc.), the training data may include the input biometric images and ground truth feature vectors. In some embodiments, if the training is for deriving only the recognition models with the feature extraction models already established, the training data relied upon may include feature vectors and ground truth labels. That is, in this case, input images may not be needed because of the established feature extraction models. In some embodiments, if training is for learning both extraction model parameters and recognition models, the training data may include input images and ground truth labels so that discrepancies between predicted labels and the ground truth labels may be used to adjust both the parameters for the extraction models and parameters associated with recognition models.

Once the training data is grouped into batches, the iterative learning process may be initiated and the learning in each iteration may be based on a batch of training data. How many batches to be used to deriving the models to be learned may depend on some pre-determined convergence condition, which may be defined based on a loss computed based on the discrepancy between predictions and ground truth from the training data. In each iteration, a next batch of training data is processed to, at 515, extract feature vectors for the images and then prediction of the label based on such extracted feature vectors. In some embodiments, the feature extraction and prediction of labels may be done by the model-based prediction unit 520 that relies on current version of the biometric feature extraction models in 230 to extract features from input images and then relies on the current version of the biometric-based recognition models in 270 to predict the labels. In other embodiments, such predictions may be done by the biometric feature extraction unit 220 and the biometric-based recognition unit 250 located in the biometric-based authentication unit 200 (see FIG. 2A). In this case, the training data batch generator 510 sends the current training data batch to unit 220 for feature extraction and prediction. The recognition prediction generated by the biometric-based recognition unit 250 is then received by the loss determiner 530.

Upon receiving the prediction results, either feature vectors or label predictions, the loss determiner 530 computes, at 525, a loss based on a discrepancy determined from the received prediction results and the ground truth from the training data batch. Such a loss is then used to determine, by the loss-based model parameter adjuster 550, the adjustments to be made to the model parameters. In some embodiments, the adjustments are determined based on specified parameter learning profile 560 that may provide a minimization scheme. In some embodiments, the following exemplary loss function may be used:

$$\ell_{ArcFace} = -\log\left(\frac{\exp(s(\cos(\theta_{y_i} + m)))}{\exp(s(\cos(\theta_{y_i} + m))) + \sum_{j=1, j \neq y_i}^{n} \exp(s(\cos\theta_j))}\right)$$

where m represents a distance among centroids representing different classes, $\theta_{y_i}$ denotes the angle between the feature vector representing a biometric image and that of the centroid feature vector of a class, i is the ith index of the descending batch stochastic gradient, $\theta_j$ denotes the angle between the feature vector and that of the centroid feature vector of class j, and n represents the number of classes. Based on this loss function, the optimization goal is to learn the parameters to maximize the angles between feature vectors of different classes, e.g., all being greater than m, and at the same time, to minimize the in-class angles between features vectors from the same class. The input to the loss determiner 530 includes the feature vector, either provided in the training data or predicted based on the biometric feature extraction models 230 as well as the centroid feature vector of each class so that the angles between the predicted feature vector and the centroid feature vectors of different classes can be used to compute the loss. Therefore, loss so determined measures the classification loss (and implicitly the loss in feature extraction as well).

Once the parameters are adjusted in one iteration, it is tested, at 545, to see whether the learning process has converged. In some embodiments, the convergence may be defined based on the magnitude of adjustments made to the parameters, e.g., if the adjustments are small, it indicates that the models are substantially converged. If the models have converged, the models in training, either the feature extraction models 230 or the recognition models 270 or both, may be established at 565. If convergence has not been detected, the iterative training process continues at 555 by proceeding to the next training data batch to start the next iteration. The learning process may not terminate until the convergence condition is satisfied.

Figure 6:
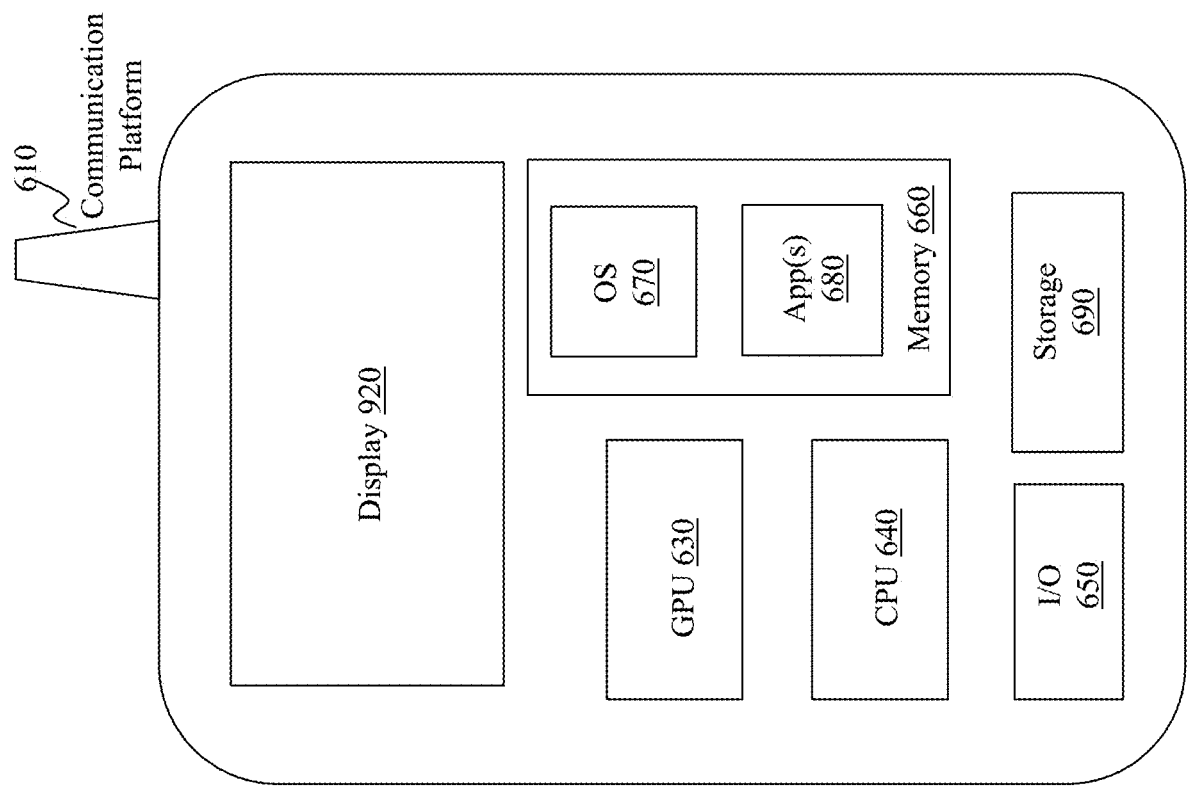
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600. User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 900 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 970, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform enabling connection to a network for biometric based authentication, comprising:
   receiving an input image representing biometric information of a person to be authenticated;
   generating a feature vector of the input image based on the biometric information captured in the input image via a convolution neural network (CNN) that is realized using one or more linear activation functions, comprising a parametric rectified linear unit (PReLU) activation function and a flexible rectified linear unit (FReLU) activation function; and
   authenticating the person based on the feature vector in accordance with a biometric-based recognition model.

2. The method of claim 1, wherein
   the input image represents a palm of the person; and
   the authentication is based on the feature vector characterizing the palm of the person.

3. The method of claim 1, wherein the step of generating the feature vector comprises:
   applying a plurality of stages of processing on the input image to generate a matrix, wherein some of the plurality of stages involves at least one of a convolution, a normalization, and a max-pooling operations using the one or more linear activation functions; and
   reshaping the matrix to generate the feature vector.

4. The method of claim 3, wherein the plurality of stages of processing is performed via the CNN utilizing the one or more linear activation functions, wherein at least some of the one or more linear activation functions is defined via at least one parameter specified by a biometric feature extraction model.

5. The method of claim 1, wherein the one or more linear activation functions include:
   a rectified linear unit (ReLU) activation function.

6. The method of claim 1, wherein the step of authenticating comprises:
   performing recognition of the person based on the feature vector in accordance with the biometric-based recognition model to generate a recognition result; and
   determining, based on the recognition result, whether the person is authorized.

7. The method of claim 1, further comprising generating the biometric-based recognition model via machine learning in an iterative learning process based on training data, which comprises:
   accessing next training data sample;
   obtaining a feature vector representing biometric characteristics of the training data sample;
   predicting an identity of a person represented by the training data sample based on currently learned parameters of the biometric-based recognition model;
   computing a discrepancy between the predicted identity and a ground truth identity provided by the training data sample;
   adjusting the currently learned parameters of the biometric-based recognition model by minimizing a loss determined based on the discrepancy, wherein
   the process of accessing, obtaining, predicting, computing, and adjusting repeats until a pre-determined convergence criterion is met.

8. Machine readable and non-transitory medium having information recorded thereon for biometric based authentication, wherein the information, once read by the machine, causes the machine to perform the steps of:
   receiving an input image representing biometric information of a person to be authenticated;
   generating a feature vector of the input image based on the biometric information captured in the input image via a convolution neural network (CNN) that is realized using one or more linear activation functions, comprising a parametric rectified linear unit (PReLU) activation function and a flexible rectified linear unit (FReLU) activation function; and
   authenticating the person based on the feature vector in accordance with a biometric-based recognition model.

9. The medium of claim 8, wherein
the input image represents a palm of the person; and
the authentication is based on the feature vector characterizing the palm of the person.

10. The medium of claim 8, wherein the step of generating the feature vector comprises:
applying a plurality of stages of processing on the input image to generate a matrix, wherein some of the plurality of stages involves at least one of convolution, normalization, and max-pooling operations using the one or more linear activation functions; and
reshaping the matrix to generate the feature vector.

11. The medium of claim 10, wherein the plurality of stages of processing is performed via the CNN utilizing the one or more linear activation functions, wherein at least some of the one or more linear activation functions is defined via at least one parameter specified by a biometric feature extraction model.

12. The medium of claim 8, wherein the one or more linear activation functions include:
a rectified linear unit (ReLU) activation function.

13. The medium of claim 8, wherein the step of authenticating comprises:
performing recognition of the person based on the feature vector in accordance with the biometric-based recognition model to generate a recognition result; and
determining, based on the recognition result, whether the person is authorized.

14. The medium of claim 8, wherein the information, when read by the machine, further causes the machine to perform the step of generating the biometric-based recognition model via machine learning in an iterative learning process based on training data, which comprises:
accessing next training data sample;
obtaining a feature vector representing biometric characteristics of the training data sample;
predicting an identity of a person represented by the training data sample based on currently learned parameters of the biometric-based recognition model;
computing a discrepancy between the predicted identity and a ground truth identity provided by the training data sample;
adjusting the currently learned parameters of the biometric-based recognition model by minimizing a loss determined based on the discrepancy, wherein
the process of accessing, obtaining, predicting, computing, and adjusting repeats until a pre-determined convergence criterion is met.

15. A system for biometric based authentication, comprising:
an imaging unit configured for acquiring an input image representing biometric information of a person to be authenticated;
a biometric feature extraction unit configured for generating a feature vector of the input image based on the biometric information captured in the input image via a convolution neural network (CNN) that is realized using one or more linear activation functions, comprising a parametric rectified linear unit (PReLU) activation function and a flexible rectified linear unit (FReLU) activation function; and
an authentication unit configured for authenticating the person based on the feature vector in accordance with a biometric-based recognition model.

16. The system of claim 15, wherein
the input image represents a palm of the person; and
the authentication is based on the feature vector characterizing the palm of the person.

17. The system of claim 15, wherein the CNN comprises:
a modified MobileNetV2 engine;
a first convolution layer; and
a second convolution layer, wherein
the CNN is configured for
applying a plurality of stages of processing on the input image to generate a matrix, wherein some of the plurality of stages involves at least one of a convolution, a normalization, and a max-pooling operations using the one or more linear activation functions, wherein the matrix is reshaped to generate the feature vector.

18. The system of claim 17, wherein
the plurality of stages of processing performed via the CNN that utilizes the one or more linear activation functions; and
at least some of the one or more linear activation functions is defined via at least one parameter specified by a biometric feature extraction model.

19. The system of claim 15, wherein the one or more linear activation functions include:
a rectified linear unit (ReLU) activation function.

20. The system of claim 15, wherein the authentication unit comprises:
a biometric-based recognition unit configured for performing recognition of the person based on the feature vector in accordance with the biometric-based recognition model to generate a recognition result; and
an authentication controller configured for determining, based on the recognition result, whether the person is authorized.

21. The system of claim 15, further comprising a model training unit configured for generating the biometric-based recognition model via machine learning in an iterative learning process based on training data, wherein, the model training unit comprises:
a training data batch generator configured for accessing next training data sample;
a model-based prediction unit configured for
obtaining a feature vector representing biometric characteristics of the training data sample, and
predicting an identity of a person represented by the training data sample based on currently learned parameters of the biometric-based recognition model;
a loss determiner configured for computing a discrepancy between the predicted identity and a ground truth identity provided by the training data sample; and
a loss-based model parameter adjuster configured for adjusting the currently learned parameters of the biometric-based recognition model by minimizing a loss determined based on the discrepancy, wherein
the process of accessing, obtaining, predicting, computing, and adjusting repeats until a pre-determined convergence criterion is met.

* * * * *